United States Patent [19]
Khanna

[11] 3,991,321
[45] Nov. 9, 1976

[54] TECHNIQUE FOR FABRICATION OF FOIL ELECTRET

[75] Inventor: Satya Pal Khanna, Indianapolis, Ind.

[73] Assignee: Bell Telephone Laboratories, Incorporated, Murray Hill, N.J.

[22] Filed: Sept. 29, 1975

[21] Appl. No.: 617,408

[52] U.S. Cl. ............................ 307/88 ET; 29/592; 29/594; 179/111 E; 427/100; 427/124; 427/125
[51] Int. Cl.² ...................... B05D 5/12; H01S 4/00
[58] Field of Search ........... 29/592, 594; 179/111 E, 179/111 R; 307/88 ET; 427/100, 124, 125

[56] References Cited
UNITED STATES PATENTS

| | | | |
|---|---|---|---|
| 3,711,941 | 1/1973 | Sessler et al. ......................... | 29/592 |
| 3,912,830 | 10/1975 | Murayama et al. .................. | 427/124 |
| 3,945,112 | 3/1976 | Schornhorn et al. ........... | 307/88 ET |

Primary Examiner—Cameron K. Weiffenbach
Attorney, Agent, or Firm—Edward M. Fink

[57] ABSTRACT

A technique for the fabrication of thin film electrets designed for use in electroacoustic transducers involves depositing a thin film of titanium upon a perfluorinated foil and, subsequently, depositing a layer of gold thereon. The resultant structure evidences adhesion characteristics which are superior to those described heretofore for metallized foils and electrical characteristics comparable to those previously described.

6 Claims, 1 Drawing Figure

U.S. Patent  Nov. 9, 1976  3,991,321
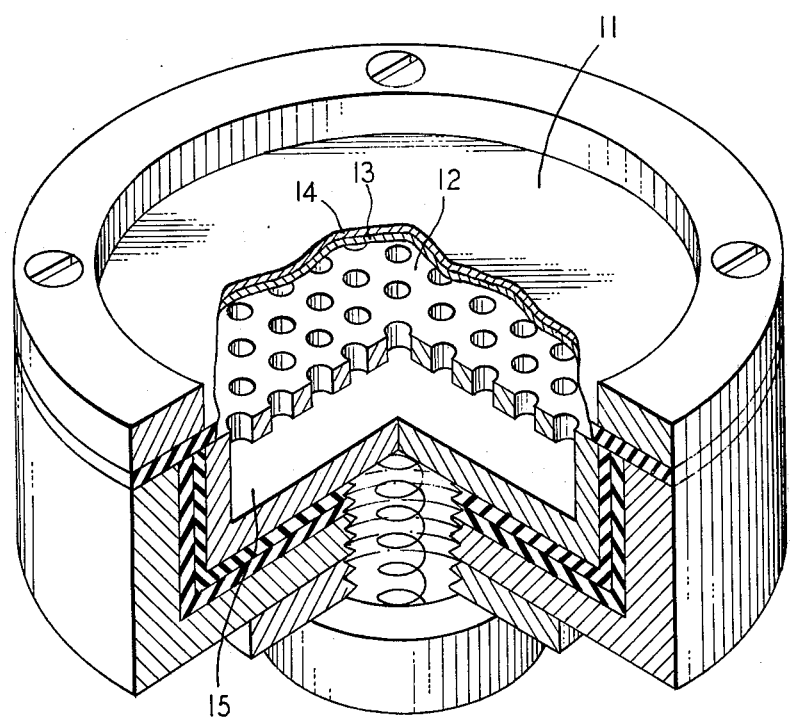

TECHNIQUE FOR FABRICATION OF FOIL ELECTRET

FIELD OF THE INVENTION

This invention relates to a technique for the fabrication of a metallized thin film foil electrets. More particularly, the present invention relates to a technique for the fabrication of a thin film foil electret comprising a fluorinated polymer having deposited thereon a thin film of gold.

DESCRIPTION OF THE PRIOR ART

In recent years, considerable interest has been focused upon a class of structures that are commonly referred to as "foil electrets", such structures being used in electrometers, dosimeters and, significantly, as the vibratile diaphragm of electroacoustic transducers. The diaphragm in such structures is typically comprised of a metallized thin foil of a fluorinated ethylene-propylene copolymer or polytetrafluoroethylene, such compositions being marketed commercially under the tradename of "Teflon FEP" or "Teflon TFE" respectively. The metallization generally employed in such applications comprises aluminum.

Studies of such electret structures have revealed that air oxidation of aluminum oftimes results in corrosion, a phenomenon which causes contact failure over large sections.

If the foil were metallized with gold instead of aluminum, the films would be completely inert to environmental conditions. Recently, therefore, emphasis has been shifted to the use of gold for this purpose. The strength of gold-Teflon joints by evaporation on untreated surfaces of Teflon foil, however, is weak. Plasma bombardment and certain treatments of the surface prior to evaporation, and sputter-deposition of gold have been used to improve the adhesive joint strengths. But these methods have degrading effects on the charge storage properties of Teflon. Irradiation of the polymer by high energy electron beams, gold evaporation and subsequent annealing result in samples with high joint strength and favorable charge retention properties. Another procedure, heretofore, for effecting this end involved depositing a thin film of aluminum by vacuum evaporation techniques and subsequently removing the metal thin film by dissolution in a solvent. Following, the desired gold film is deposited by vacuum evaporation. This approach also yields a structure in which the tensile sheer strength of the metallized foil approaches the cohesive strength of Teflon while preserving its electrical characteristics. The irradiation method requires a sophisticated electron bombarding facility in addition to a vacuum evaporator for gold metallization and the second method needs two evaporation runs with a step involving wet chemistry in-between the two evaporations. Accordingly, interest has been focused on a simpler and less costly process for obtaining electret foils with adherent gold metallization.

SUMMARY OF THE INVENTION

In accordance with the present invention this end has been attained by the deposition of a thin film of a glue layer upon the foil base prior to deposition of gold. Briefly, the invention involves sequentially evaporating in a single evaporation run a thin film of titanium or a nickel-chromium alloy upon the fluorinated polymer and then gold. Studies of structures so produced reveal that the metallization evidences tensile sheer strengths which are superior to those evidenced by the aforementioned prior art structures having gold deposited thereon.

BRIEF DESCRIPTION OF THE DRAWING

The invention will be more fully understood by reference to the following detailed description taken in conjunction with the accompanying drawing wherein:

The FIGURE is a sectional view of an electrostatic acoustic transducer including a thin film foil electret prepared in accordance with the invention.

DETAILED DESCRIPTION

The first step in the fabrication of a thin film electret in accordance with the present invention involves depositing a thin film of a metal or alloy selected from the group consisting of titanium and nickel-chromium alloys comprising from 70–80 percent nickel by weight remainder chromium upon one surface of the sample of the perfluorinated polymer, typically fluorinated ethylenepropylene copolymer or polytetrafluoroethylene.

In the typical operation of the process, a one mil thick length of perfluorinated polymer foil four inches wide and eighteen inches long is stretched in front of a water-cooled copper platen inside a 24-inch bell-jar vacuum evaporator. The glue metal film described above is deposited in a thickness of at least a monolayer. The general thickness is restricted to within the range of 10–100 Angstroms. Following the deposition of the glue layer, gold having a thickness range of 1500–2500 Angstroms is deposited upon the surface of the metal or alloy, the gold being designed to serve as one electrode of the desired electret. The thickness limits are based on practical considerations such as continuity requirements. The two-layer metallization as described is achieved by sequential evaporation of the two metals. The process can be easily adapted for production volume metallization of the Teflon foil by moving the foil in front of the platen from a feed roll to a take-up spool with the help of suitable rollers, gears and a motor. The two evaporant sources are fired simultaneously but the foil will see these in sequence. The complete roll of metallized foil can then be charged by a suitable method and cut in strips of the proper area for use in the electret transducer.

For checking adherence of gold-Teflon, composites are formed by cutting strips from the metallized Teflon samples and joining both sides by means of a conventional epoxy adhesive to pieces of aluminum which have been chemically etched. The composites are bonded at 70° C in a device capable of maintaining a 1.25 cm overlap. Following curing of the epoxy, the composites are tested for joint strength in an Instron in accordance with ASTM-D 1002-64. For comparative purposes, gold-Teflon samples were prepared wherein the gold was either deposited directly upon the Teflon surface or deposited subsequent to deposition and dissolution of a thin film of aluminum thereon. The adhesive joint strengths for various composites are shown in the table set forth below.

| Film | Tensile Shear Strength of composites kg/cm$^2$ |
| --- | --- |
| 1. Teflon FEP (as received, no | Approximately 0 |

| Film | Tensile Shear Strength of composites kg/cm² |
|---|---|
| metallization) | |
| 2. Teflon FEP (after removal of 1000 A of aluminum, 1000 A of gold was deposited) | 80 |
| 3. Teflon FEP (1000 A gold deposited on untreated Teflon) | 0.070 |
| 4. Teflon FEP (< 100 A titanium beneath 2000 A gold) | 142.5 |

The data shown in the foregoing table indicate that the joint strengths for evaporated gold-Teflon FEP composites without prior treatment of the Teflon are negligible. Joint strengths are enhanced when aluminum is deposited by evaporation onto previously untreated Teflon FEP, dissolved, and gold deposited thereon. However, the use of a titanium glue layer in accordance with the present invention results in joint strengths far in excess of those previously reported. Similar results are obtained with polytetrafluoroethylene teflon. Stringent environmental testing further, has not revealed any drastic degredation in adherence.

Following treatment the prepared electret structure may be used in the fabrication of an electroacoustic transducer of the type depicted in the FIGURE.

With reference now more particularly to the FIGURE, there is shown a sectional view of an electroacoustic transducer including a thin film electret of the type prepared in accordance with the invention. Shown in the FIGURE is a perfluorinated film 13 in which electrical charges have been imbedded by a complex process. The metallized film is stretched taut in front of a conductive backplate 12 but the two are kept separated by an air gap. Film 13 typically comprises a perfluorinated ethylene-propylene copolymer (Teflon FEP) of a thickness of about 0.001 inch. Shown deposited upon the upper surface of film 13 is a thin layer of titanium or a nickel-chromium alloy 14 and a thin layer of gold 11 thereon as described above. The metallized and charge-injected polymer film is commonly referred to as a metallized foil electret. Any deflection of the foil upon impingement of sound waves results in a change of capacitance of the system. This provides an electrical signal which can be amplified. Since the material has been processed to contain its own charge, an external polarization voltage is not required. The backplate surface is typically arranged so that the foil can contact its surface at discrete points or along discrete lines only. Backplate 12 is perforated and supported above an air cavity 15. This arrangement removes the stiffness of the air cushion behind the diaphragm and permits vibration of the film with a greater amplitude thereby increasing transducer sensitivity. It will be appreciated by those skilled in the art that the present invention is not limited to the fabrication of foil electrets and may be used in the fabrication of gold metallized foils suitable for diverse applications in which good electrical properties are desired. It will also be appreciated that an automatic system can be implemented that would allow long strips of material to be fabricated using this method.

What is claimed is:

1. Technique for the fabrication of a foil electret which comprises the steps of depositing a film of gold on the surface of a perfluorinated polymer foil and charging the non-gold coated surface of the foil, the improvement which comprises evaporating a thin film of a material selected from the group consisting of titanium and nickel-chromium alloys upon said foil which remains thereon prior to deposition of gold thereon.

2. Technique in accordance with claim 1 wherein the thickness of said thin film ranges from 10–100 Angstroms.

3. Technique in accordance with claim 1 wherein said thin film is titanium.

4. Technique in accordance with claim 1 wherein said foil is polytetrafluoroethylene.

5. Technique in accordance with claim 1 wherein said thin film is a nickel-chromium alloy.

6. Thin film foil electret prepared in accordance with the procedure of claim 1.

* * * * *